United States Patent
Dinh et al.

(10) Patent No.: US 9,254,949 B2
(45) Date of Patent: Feb. 9, 2016

(54) ANTI-SLIP CABLE TIE

(71) Applicant: Thomas & Betts International, Inc., Wilmington, DE (US)

(72) Inventors: Cong T. Dinh, Collierville, TN (US); Andrew C. Cole, Southaven, MS (US); Mark R. Drane, Germantown, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 188 days.

(21) Appl. No.: 13/796,715

(22) Filed: Mar. 12, 2013

(65) Prior Publication Data

US 2013/0333164 A1    Dec. 19, 2013

Related U.S. Application Data

(60) Provisional application No. 61/659,620, filed on Jun. 14, 2012.

(51) Int. Cl.
  *B65D 63/08* (2006.01)
  *B65D 63/00* (2006.01)
  *H02G 3/32* (2006.01)

(52) U.S. Cl.
  CPC .............. *B65D 63/00* (2013.01); *B65D 63/08* (2013.01); *H02G 3/32* (2013.01); *Y10T 24/14* (2015.01); *Y10T 24/1473* (2015.01)

(58) Field of Classification Search
  CPC .......... B65D 63/1027; B65D 63/1036; B65D 63/1045; B65D 63/1054; B65D 63/1063; B65D 63/1072; B65D 63/1081; B65D 63/1018; B65D 63/10
  USPC ............................................. 24/16 R, 16 PB
  See application file for complete search history.

(56) References Cited

U.S. PATENT DOCUMENTS

| | | |
|---|---|---|
| 3,303,669 A | 2/1967 | Oetiker |
| 4,399,592 A | 8/1983 | Chopp, Jr. |
| 5,103,534 A | 4/1992 | Caveney |
| 5,329,671 A | 7/1994 | Walczak et al. |

(Continued)

FOREIGN PATENT DOCUMENTS

| | | |
|---|---|---|
| EP | 0861994 B1 | 10/2002 |
| EP | 1359356 A1 | 11/2003 |

(Continued)

OTHER PUBLICATIONS

European Search Report dated Feb. 2, 2014, issued in corresponding European patent application EP13172131, 7 pages.

*Primary Examiner* — Robert J Sandy
*Assistant Examiner* — Matthew Sullivan
(74) *Attorney, Agent, or Firm* — Snyder, Clark, Lesch & Chung, LLP (57) ABSTRACT

A cable tie includes a band having a first end and a second end a housing, affixed to the band near the second end, with a first opening to receive the first end of the band. The housing comprises a first mass near the first opening and one side of the housing, a stop mass near a second side of the housing, and a second mass between the first mass and the stop mass. When the first end is inserted into the housing, the second mass prevents the first mass from moving a first distance occupied by the second mass, toward the stop mass. When the first end in the housing is being pulled out of the housing, the first mass locks the first end in the housing and prevents the first end from slipping over a second distance.

18 Claims, 5 Drawing Sheets

(56) References Cited

U.S. PATENT DOCUMENTS

| | | | |
|---|---|---|---|
| 5,630,252 A * | 5/1997 | Wells | 24/16 PB |
| 5,722,117 A | 3/1998 | Nielsen | |
| 5,732,446 A * | 3/1998 | Blanks | 24/25 |
| 5,850,674 A * | 12/1998 | Jansen | 24/21 |
| 6,076,235 A | 6/2000 | Khokhar | |
| 6,122,804 A | 9/2000 | Gamaggio-Schafer | |
| 6,446,474 B1 * | 9/2002 | Tabacchi et al. | 70/16 |
| 6,477,746 B1 * | 11/2002 | Axelsson | 24/25 |
| 6,647,596 B1 * | 11/2003 | Caveney | 24/21 |
| 6,668,427 B2 * | 12/2003 | Bulanda et al. | 24/25 |
| 7,669,293 B2 | 3/2010 | Huang | |
| 7,866,007 B2 | 1/2011 | DeBerry et al. | |
| 7,930,805 B2 * | 4/2011 | Bulanda | 24/25 |
| 8,225,461 B2 * | 7/2012 | Bulanda et al. | 24/21 |
| 8,635,745 B2 * | 1/2014 | DeBerry et al. | 24/25 |
| 8,800,115 B2 * | 8/2014 | Gingell | 24/25 |
| 2003/0204936 A1 * | 11/2003 | Caveney | 24/20 EE |
| 2003/0204937 A1 * | 11/2003 | Bulanda et al. | 24/22 |
| 2004/0016085 A1 * | 1/2004 | Caveney | 24/16 PB |
| 2007/0226963 A1 * | 10/2007 | DeBerry et al. | 24/20 R |
| 2008/0178434 A1 * | 7/2008 | Bulanda | 24/25 |
| 2009/0000082 A1 * | 1/2009 | Bulanda et al. | 24/21 |
| 2010/0229350 A1 * | 9/2010 | Kostal et al. | 24/16 PB |
| 2011/0083302 A1 * | 4/2011 | DeBerry et al. | 24/21 |
| 2012/0124783 A1 * | 5/2012 | DeBerry et al. | 24/20 R |
| 2012/0279018 A1 * | 11/2012 | DeBerry et al. | 24/21 |
| 2013/0007992 A1 * | 1/2013 | Gingell | 24/20 EE |
| 2014/0237772 A1 * | 8/2014 | Crouse | 24/22 |

FOREIGN PATENT DOCUMENTS

| | | |
|---|---|---|
| EP | 1359357 A1 | 11/2003 |
| WO | 2008092070 A2 | 7/2008 |

* cited by examiner

ANTI-SLIP CABLE TIE

RELATED APPLICATION

This application claims priority under 35 U.S.C. §119 based on U.S. Provisional Patent Application No. 61/659,620 filed Jun. 14, 2012, the disclosure of which is incorporated by reference herein in its entirety.

BACKGROUND INFORMATION

A cable tie is used for fastening, binding, bundling, and/or organizing cables/wires. Different types of cable ties are made for use in different environments and applications. For example, some cable ties are made for outdoor use. Some cable ties are made for a specific industry, such as the food industry. Some are made for heavy-duty use (e.g., cable ties made of metal), for bundling large cables.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements.

As described herein, an anti-slip cable tie provides for a small/minimum slack in binding, fastening or bundling cables. To tie/bundle cables using the anti-slip cable tie, one end of a band, of the cable tie, that encircles the cables is inserted into the housing of a locking body of the cable tie. When the end of the band is inserted within the housing of the locking body, the band pushes a ball bearing within the housing toward an inner wall of the housing. Another ball within the housing, however, prevents the ball bearing from moving backwards beyond a point and bumping into the inner wall. When the band is pulled/tugged in the forward direction away from the inner wall, the ball bearing, being close to a front of the wall, prevents the end of the band from slipping and locks the band in place.

Figure 1A:
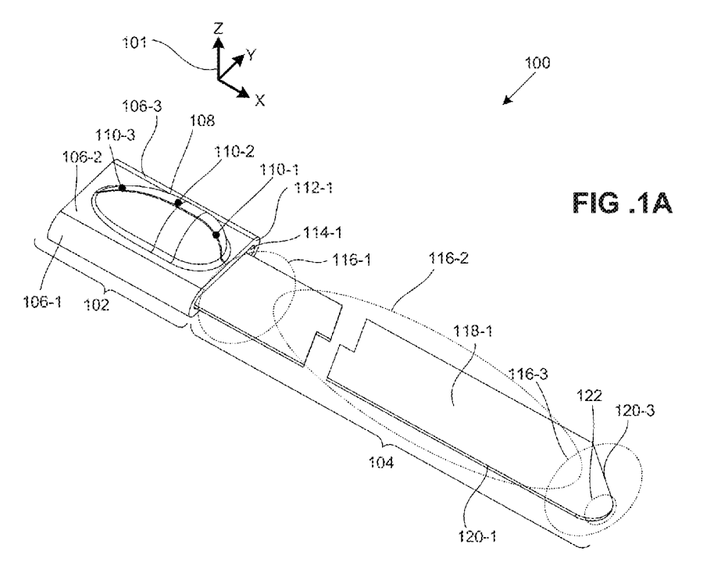
FIG. 1A is an isometric perspective top/side view of an exemplary cable tie in an open configuration according to one implementation.

FIG. 1A shows an isometric perspective top/side view of an exemplary cable tie 100 in an open configuration according to one implementation, together with an xyz-axes 101. As shown, cable tie 100 includes locking body 102 and a band 104. In FIG. 1A, cable tie 100 is oriented such that band 104 extends along the x-axis of xyz-axes 101 and the unit normal vector of the flat surface of band 104 is parallel to the z-axis. Band 104 has an interior portion inside of housing 102.

When band 104 is wrapped about cables and an end of band 104 (e.g., section 116-3) is inserted within locking body 102, locking body 102 prevents the end from slipping back out of locking body 102 and the band from unwrapping about the cables.

Locking body 102 includes a side wall 106-1, a top wall 106-2, a side wall 106-3, bottom walls 106-4 and 106-5 (shown in FIG. 1B), and housing 108. Walls 106-1 through 106-5 (collectively referred to as "walls 106") extend along the x-axis from a side face 112-1 to a side face 112-2 (shown in FIG. 1B). In one implementation, walls 106 may be made of one continuous strip of rigid material wrapped (e.g., loosely) about band 104, such that there is a gap/opening 114-1 and gap/opening 114-2 (FIG. 1B) between walls 106 and band 104.

Housing 108 includes a side portion 110-1 (also referred to as a "stop 110-1"), a top portion 110-2, and a side portion 110-3 (collectively referred to as "portions 110"). As further described below, portions 110 are configured/shaped to enclose and interact with elements within housing 108, to prevent a portion of band 104 (which was inserted through opening 114-1 and 114-2) from sliding out from housing 108 when anti-slip cable tie 100 is in the closed configuration. In FIG. 1A, housing 108 is in the shape of a dome, and may be made of steel, plastic, or another suitable material.

Band 104 includes an entrance section 116-1, a middle section 116-2, and an end section 116-3. Band 104 also includes a side edge 120-1, a front edge 120-2, and a side edge 120-3 (not shown). In one embodiment, side edge 120-1 and front edge 120-2 form an acute angle, such that, along the side edge 120-1 and parallel to the x-axis, the end of band 104 tapers to a tip 122 that can be more easily inserted into a gap/opening 114-2 (see FIG. 1B) after band 104 is bound around cables/wires, to result in a closed (loop) configuration. The end of tip 122 may be rounded, so that a user may not easily and accidentally puncture oneself with tip 122. In one embodiment, when band 104 binds/bundles cables/wires, bottom surface 118-2 (FIG. 1B) of band 104 may face the cables/wires and be in contact with the cables/wires. Band 104 may be made of flexible material, such as steel, or another material.

Figure 1B:
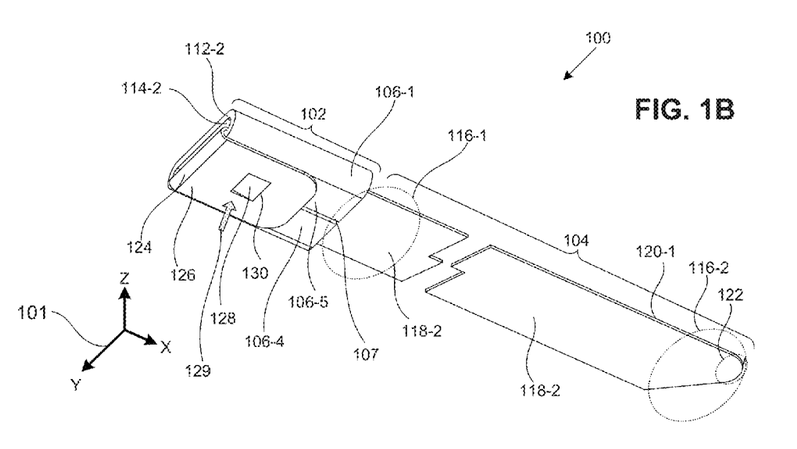
FIG. 1B is an isometric perspective bottom/side view of the cable tie of FIG. 1A in the open configuration.

FIG. 1B shows an isometric perspective bottom/side view of cable tie 100 in an open configuration, together with an xyz-axes 101. FIG. 1B illustrates a number of features, of cable tie 100, that are not shown in FIG. 1A. For example, FIG. 1B shows side edge 112-2 with gap/opening 114-2. FIG. 1B also shows band 104 extending from entrance portion 116-1 into locking body 102 (along the negative x-axis) and exiting from locking body 102 via opening 114-2 to form a clip 124 with a flap 126 that covers bottom walls 106-4 and 106-5 in the direction of the x-axis. As shown, clip 124 and flap 126 are integrally formed with band 104. In a different implementation, clip 124 and flap 126 be constructed separately from band 104 and then affixed together via screws or another mechanism.

As shown in FIG. 1B, flap 126 includes, in one embodiment, at about the middle of its surface, a tab 128 with a crease 130. Bottom walls 106-4 and 106-5 above tab 128 has a hole (e.g., a square hole whose front edge is aligned with a front edge of tab 128) (not shown in FIG. 1B). Tab 128 is thrust upward in the direction of arrow 129 into the hole, bent about crease 130 (e.g., in the direction of the z-axis).

In this configuration, side walls 106-1 and 106-3 of locking body 102, clip 124, and tab 128 hold/affix a portion of locking body 102 to an interior portion of band 104, with the bottom surface 118-2 of band 104 being flush with an interior surface (the surface within locking body 102) of bottom walls 106-4 and 106-5 and the top surface of flap 126 being flush with the exterior surface (the surface in the −z direction) of bottom walls 106-4 and 106-5. Side walls 106-1 and 106-3 prevent the interior portion of band 104 from moving laterally in the negative/positive y-direction with respect to locking body 102. Clip 124, which is integral to band 124, prevents locking body 102 from sliding in the negative/positive x-direction relative to the interior portion of band 104. Tab 128, having been pushed into the hole in bottom walls 106-4 and 106-5, catches an edge of the hole when an external force is applied to locking body 102 relative to the interior portion of band 104 in the positive x-direction. Tab 128 and the hole prevents locking body 102 from sliding in the x-direction relative to the interior portion of band 104.

Figure 2:
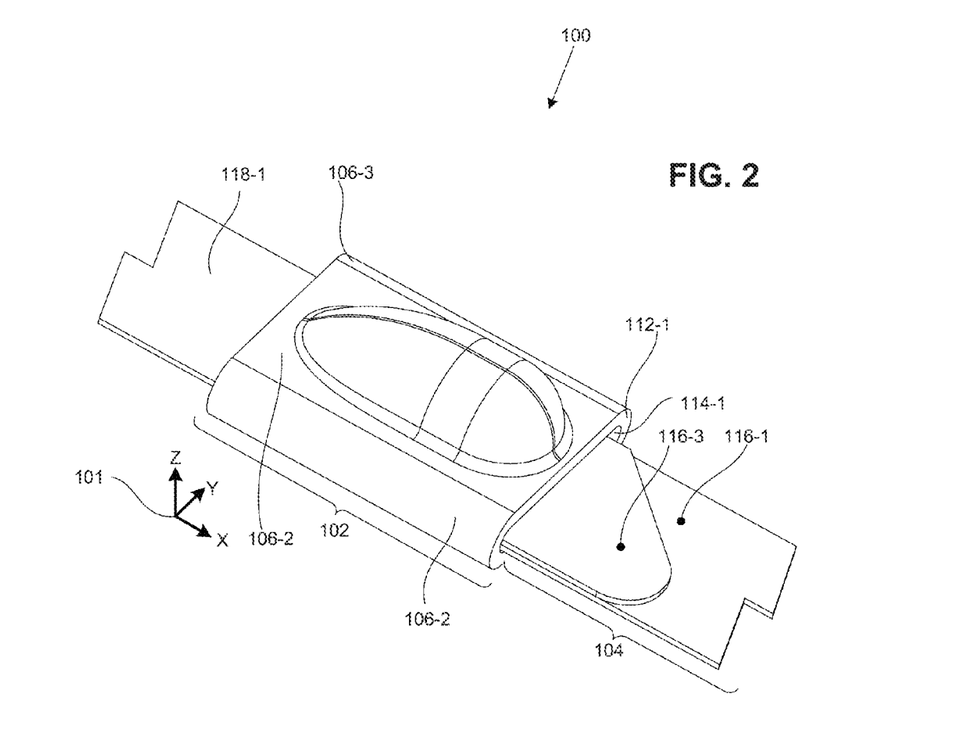
FIG. 2 is an expanded isometric perspective top/side view of the cable tie of FIG. 1A in the closed configuration.

FIG. 2 is an expanded isometric perspective top/side view of cable tie 100 in the closed configuration. In FIG. 2, end portion 116-3 of band 104 has been inserted into gap/hole 114-2 formed at side wall 112-2 of locking body 102, and passed through and out of locking body 102 via gap/hole 114-1, resulting in the closed configuration. In the configuration, a section/portion of band 104 (e.g., end section 116-3) overlaps with entrance portion 116-1 of band 104. In FIG. 2, bottom surface 118-2 of end section 116-3 would be in contact with the top surface 118-1 of entrance section 116-1.

Figure 3:
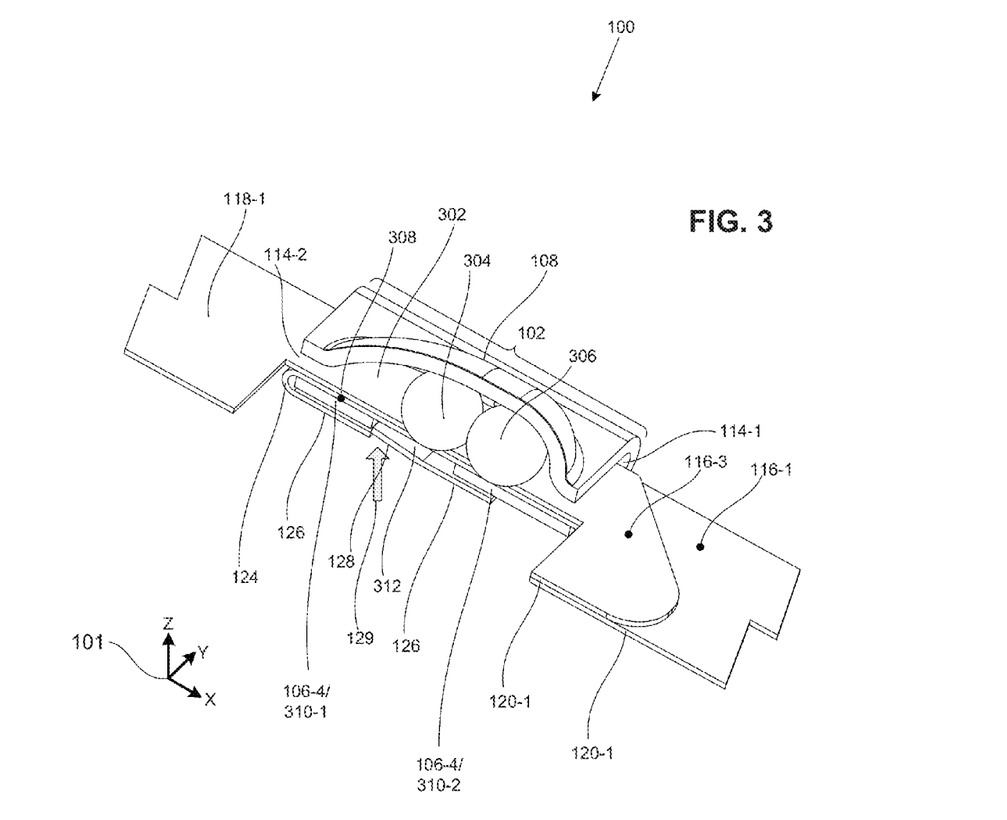
FIG. 3 is an isometric cut-away perspective top/side view of the cable tie of FIG. 1A in the closed configuration.

FIG. 3 is an isometric cut-away perspective top/side view of cable tie 100 in the closed configuration. FIG. 3 shows a number of features that are not visible in FIG. 1A through FIG. 2. As shown, housing 108 encloses space 302 in which a ball bearing 304 and sphere 306 are placed. In one implementation, ball bearing 304 may be made of metal (e.g., steel) and sphere 306 may be made of elastomeric or another material (e.g, plastic, rubber, sponge-like or spring-like material, stainless steel sponge, etc.). In the implementation illustrated in FIG. 3, ball bearing 304 and sphere 306 may have approximately the same diameter. In other implementations, the diameters may be different.

FIG. 3 also shows entrance portion 116-1 extending into housing 108 as an interior section/portion 308, which joins dip 124. In the closed configuration, interior section 308 is underneath end section 116-3 and above bottom walls 106-4 and 106-5. In FIG. 3, bottom wall 106-4 is illustrated as having front area 310-1 and a rear area 310-2. Between front area 310-1 and rear area 310-2 is a rectangular/square hole 312, into which tab 128 protrudes in the direction of arrow 129. As explained above, an edge of tab 128 engages an edge of square hole 312 if housing 108 is pushed/pulled in the x-direction relative to interior section 308, and prevents housing 108 from sliding in the x-direction relative to interior section 308 (e.g., prevents housing 108 from detaching from interior portion 308 of band 104).

Figure 4A:
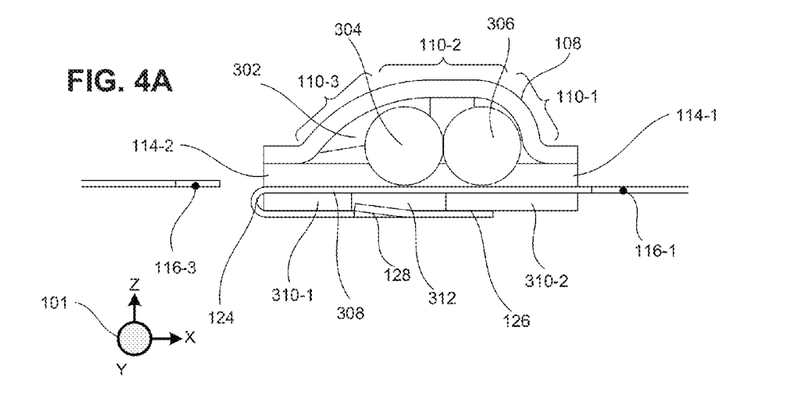
FIG. 4A is a cross-sectional side view of the cable tie before an end of the cable tie of FIG. 1A is inserted into a locking body of the cable tie.
Figure 4B:
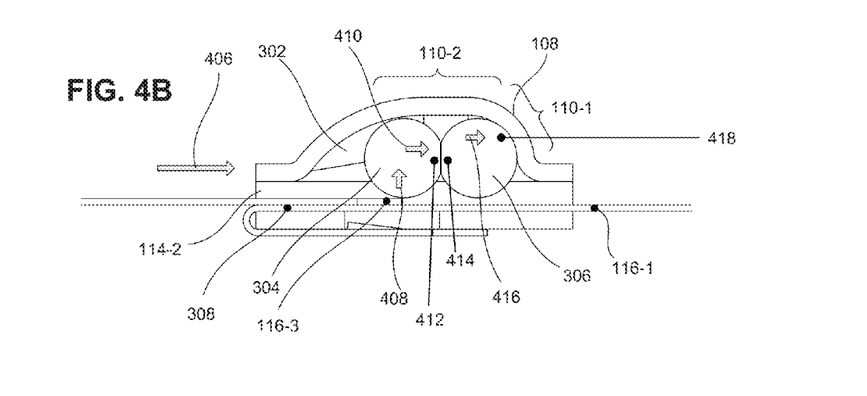
FIG. 4B is a cross-sectional side view of the cable tie when the end of the cable tie of FIG. 1A is partially inserted into the locking body of the cable tie.
Figure 4C:
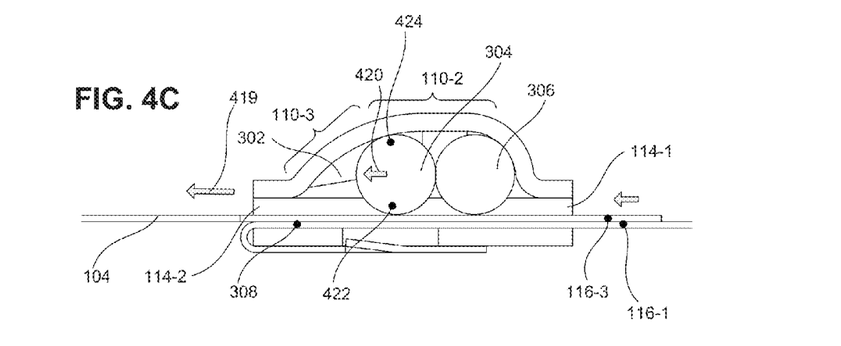
FIG. 4C is a cross-sectional side views of the cable tie after the end of the cable tie of FIG. 1A is inserted into the locking body and the cable tie is in the closed configuration.

FIGS. 4A through 4C are cross sectional side views of cable tie 100 at different stages of closing cable tie 100 into a loop. FIG. 4A is a cross sectional side view of cable tie 100 before end section 116-3 of band 104 is inserted into locking body 102 via gap/opening 114-2 to be in the closed configuration. Like FIG. 3, FIG. 4A shows ball bearing 304 and sphere 306 occupying space 302 of housing 108.

FIG. 4B is a cross sectional side view of cable tie 100 when end section 116-1 of band 104 is partially inserted into locking body 102 of cable tie 100. In FIG. 4B, after band 104 is wrapped about a bundle of cables/wires, end section 116-3 is pushed in the direction of arrow 406 via gap/opening 114-2 into housing 108. Consequently, end section 116-3 overlaps with interior section 308. As end section 116-3 moves further in the direction of arrow 406, section 116-3 pushes ball bearing 304, causing ball bearing 308 to move in the direction of arrow 408, such that section 116-3 may slide underneath ball bearing 308. In addition, section 116-3 also pushes ball bearing 304 in the direction of arrow 410, causing an area 412 on ball bearing 304 to contact an area 414 of sphere 306. Although the force on area 414 pushes sphere 416 in the direction of arrow 416, because area 418 of sphere 416 is in contact with stop 110-1 (or the interior surface of side portion 110-1) of housing 108, sphere 306 moves, in the direction of x-axis, little or no distance. Accordingly, sphere 306 prevents ball bearing 304 from moving further in the direction of arrow 410 and touching stop 110-1.

FIG. 4C is a cross sectional side view of cable tie 100 after end section 116-3 of band 104 is inserted into locking body 102 and cable tie 100 is in the closed configuration. In FIG. 4C, having been inserted fully into housing 108, end section 116-3 overlaps with entrance section 116-1. From this position, if band 104 is pulled in the direction of arrow 419, the frictional force between band 104 and ball bearing 304 causes ball bearing 304 to move in the direction of arrow 420 to the extent that there is space/clearance in space 302. Because space 302 within housing 108 is tapered in the negative x-direction, as ball bearing 304 is driven in the direction of arrow 420 until ball contacts the surface of portion 110-3 (also referred to as "stop 110-3"), area 424 and 422 of ball bearing 304 exert increasing force on the interior surface of portion 110-3 of housing 108 and on the top surface of end section 116-3 of band 104, respectively. The downward force exerted by area 422 of ball bearing 304 on end section 116-3 may pinch end section 116-3 between ball bearing 304 and interior section 308, and thus prevent end section 116-3 from retreating back in the direction of arrow 410 through gap/opening 114-2. That is, ball bearing 304 provides for the locking mechanism of cable tie 100.

As briefly discussed above, in a different embodiment without sphere 306 in space 302, when end section 116-3 is inserted into housing 108, end section 116-3 may cause ball bearing 304 to move all the way (or significant portion of the way) to stop 110-1 of housing 108. With ball bearing 304 in such a position, if band 104 were pulled back in the direction of arrow 419 (e.g., due to the weight of cables that are bound by cable tie 100), as end section 116-3 moves in the same direction relative to housing 108, ball bearing 304 would also move from the stop 110-1 of housing 108 toward the interior surface of portion 110-3 of housing 108, until ball bearing 304 locks end section 116-3, and, therefore, band 104. The distance covered by ball bearing 304 until ball bearing 304 locks band 104 is approximately the amount of slippage of band 104 allowed by cable tie 100. The slippage may result in an undesirable amount of slack in band 104 when cable tie 100 is in the closed configuration, with band 104 wrapped about cables/wires.

In contrast, with sphere 306 in place as illustrated in FIGS. 3, 4A, 4B, and 4C, ball bearing 304 cannot move in the direction of arrow 410 when end section 116-3 is inserted into housing 108 (or can only move a small amount). Hence, when band 104 is pulled in the direction of arrow 419 (e.g., by the weight of the cables that are wrapped by band 104), ball bearing 304 cannot travel a significant distance until ball bearing 304 locks band 104. In other words, sphere 306 prevents band 104 from slipping, and thus creating slack between band 104 and the cables bundled by cable tie 100 (e.g., slipping distance<the distance occupied by sphere 306 (e.g., the diameter)).

Figure 5A:
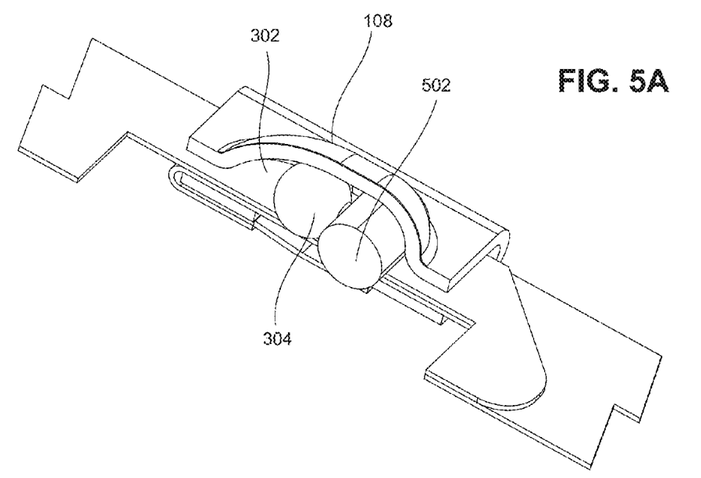
FIG. 5A is an isometric cut-away perspective top/side view of the cable tie according to another implementation.

FIG. 5A is an isometric cut-away perspective top/side view of cable tie 100 according to another implementation. In this implementation, cable tie 100 includes, in place of sphere 306, a cylinder 502. Cylinder 502 may play a role similar to that of sphere 306 in the implementations described above.

Figure 5B:
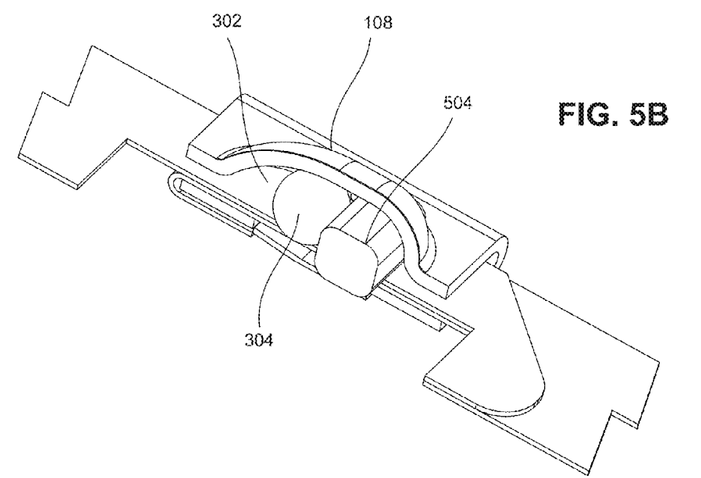
FIG. 5B is an isometric cut-away perspective top/side view of the cable tie according to yet another implementation.

FIG. 5B is an isometric cut-away perspective top/side view of cable tie 100 according to another implementation. In this implementation, cable 100 includes, in place of sphere 306, a block 504. Block 504 may prevent ball bearing 304 from allowing undesirable slippage of band 104 when band 104 is closed around cables/wires, in a manner similar to that described above for sphere 306 (e.g., by occupying a space between ball bearing 304 and stop 110-1 of housing 108.

The foregoing description of implementations provides illustration, but is not intended to be exhaustive or to limit the implementations to the precise form disclosed. Modifications and variations are possible in light of the above teachings or may be acquired from practice of the teachings. For example, in some implementations, housing 108 may be shaped differently than that illustrated in FIGS. 1-5B. Furthermore, in some implementations, more than a single sphere 306, cylinder 502, or block 504 may be placed within housing 108 to prevent ball bearing 304 from "sloshing" and allowing slippage of band 104 in the closed configuration. In some implementations, in place of sphere 306 or cylinder 502, or block 504, a spring or spring-like component may be placed in housing 108 to prevent slippage. Furthermore, depending on the implementation, a different type of band 104 may be used in place of band 104 (e.g., thicker band, narrower band, etc.). In still other implementations, top surface 118-1 of band 104, the interior surfaces of housing 108, and/or ball bearing 304 may include ridges to increase the friction between top surface 118-1 of band 104, the interior surfaces of housing 108, and/or ball bearing 304.

Although different implementations have been described above, it is expressly understood that it will be apparent to persons skilled in the relevant art that the implementations may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A cable tie comprising:
   a band that extends lengthwise from a first end to a second end;
   a housing, affixed near the second end, with a first opening to receive the first end of the band when the first end of the band is brought toward the housing in a loop, wherein the housing comprises:
      walls that enclose a space and have a stop toward the first end of the band;
      a ball in the space; and
      a mass placed in the space and between the ball and the stop;
      wherein when the first end is inserted into the housing in an insertion direction, the first end passes under the ball and the mass and exerts a pull on the ball toward the mass,
      wherein, after the first end has been inserted into the housing and when the first end is being pulled out of the housing in a direction opposite the insertion direction, the ball is wedged in the housing and locks the first end in the housing before the first end slips a second distance in the direction opposite the insertion direction the first end is pulled, and
      wherein, when the first end is locked in the housing by the ball, the ball is prevented by the mass from moving a first distance occupied by the mass in the space, toward the stop and from moving into a position where the first end can slip toward outside the housing.

2. The cable tie of claim 1, wherein the second distance is less than the first distance.

3. The cable tie of claim 1, wherein the mass includes one of:
   a box, a sphere, or a cylinder.

4. The cable tie of claim 1, wherein the ball comprises steel.

5. The cable tie of claim 1, wherein the mass includes one of:
   plastic; rubber; sponge-like or spring-like material; or stainless steel sponge.

6. The cable tie of claim 1, wherein the walls includes:
   a first side wall about one side edge of the band;
   a second side wall about the other side edge of the band;
   one or more bottom walls covering a bottom surface of the band, and
   a top wall, over a top surface of the band, that includes a dome defining the space,
   wherein the first side wall, top wall, second side wall, and bottom wall are wrapped around the band near the second end,
   wherein each of the walls extends from a first side facing away from the first end to a second side facing toward the first end of the band, and
   wherein the first and second sides are perpendicular to the line from the first end to the second end, and include the first opening and a second opening, respectively, formed by the walls wrapped around the band.

7. The cable tie of claim 6, wherein the second end of the band extends from the second opening away from the first end, folds over the bottom walls, and forms a flap.

8. The cable tie of claim 7, wherein the bottom walls include a hole,
   wherein the flap includes a tab that bends into the hole, such that when the housing is pulled along the line toward the first end, an edge of the hole abuts the tab to prevent the flap, the second end, and the band from being pulled apart from the bottom walls and the housing.

9. The cable tie of claim 6, wherein the dome comprises a front portion toward the second end of the band, a rear portion away from the second end of the band, and a middle portion adjoining the first portion and the second portion,
    wherein the space defined by the walls tapers toward the second end of the band such that as the ball moves toward the second end, the space becomes narrower to increase a frictional force applied by the ball on the first end and lock the band to the housing.

10. The cable tie of claim 1, wherein the first end of the band is tapered.

11. The cable tie of claim 10, wherein the first end is rounded.

12. A cable tie comprising:
a band having a first end and a second end;
a housing, affixed to the band near the second end, with a first opening to receive the first end of the band, wherein the housing comprises:
    a ball near the first opening and one side of the housing;
    a stop mass near a second side of the housing; and
    a mass between the ball and the stop mass,
    wherein, after the first end has been inserted into the housing in an insertion direction and when the first end in the housing is being pulled out of the housing in a direction opposite the insertion direction, the ball is wedged in the housing and locks the first end in the housing to prevent the first end from slipping over a second distance in the direction opposite the insertion direction the first end is pulled, and
    wherein, when the first end is locked in the housing by the ball, the ball is prevented by the mass from moving a first distance occupied by the mass in the space, toward the stop mass, and from moving into a position where the first end can slip toward outside the housing.

13. The cable tie of claim 12, wherein the second distance is less than the first distance.

14. The cable tie of claim 12, wherein the mass includes one of:
a box, a sphere, or a cylinder.

15. The cable tie of claim 12, wherein the ball comprises steel.

16. The cable tie of claim 12, wherein the mass includes:
an elastomeric material; or
a stainless steel sponge.

17. The cable tie of claim 12, wherein the first end of the band is tapered.

18. The cable tie of claim 12, wherein the band includes steel.

\* \* \* \* \*